(12) United States Patent
McDaniel et al.

(10) Patent No.: US 7,473,677 B2
(45) Date of Patent: Jan. 6, 2009

(54) HIGH PRODUCTIVITY PROCESS FOR ALKYLPHENOL ETHOXYLATES

(75) Inventors: Kenneth G. McDaniel, Charleston, WV (US); James R. Reese, II, Hurricane, WV (US)

(73) Assignee: Bayer MaterialScience LLC, Pittsburg, PA (US)

( * ) Notice: Subject to any disclaimer, the term of this patent is extended or adjusted under 35 U.S.C. 154(b) by 106 days.

(21) Appl. No.: 11/787,351

(22) Filed: Apr. 16, 2007

(65) Prior Publication Data

US 2008/0255394 A1    Oct. 16, 2008

(51) Int. Cl.
*C11D 1/72* (2006.01)
*C11D 13/00* (2006.01)
*C07C 41/01* (2006.01)
*C07C 43/164* (2006.01)

(52) U.S. Cl. .................. 510/421; 568/616; 568/618; 568/626

(58) Field of Classification Search ................. 510/421; 568/616, 618, 626
See application file for complete search history.

(56) References Cited

U.S. PATENT DOCUMENTS

| 5,689,012 | A | 11/1997 | Pazos et al. ............. 568/619 |
| 5,777,177 | A | 7/1998 | Pazos ..................... 568/679 |
| 6,355,845 | B1 | 3/2002 | Clement et al. ......... 568/616 |
| 6,429,342 | B1 | 8/2002 | Clement et al. ......... 568/616 |
| 6,642,423 | B2 | 11/2003 | Clement et al. ......... 568/616 |
| 6,821,308 | B2 * | 11/2004 | Combs et al. ............ 44/443 |
| 7,012,164 | B2 | 3/2006 | Yamada et al. ........... 568/620 |
| 2002/0198413 | A1 | 12/2002 | Clement et al. ......... 568/672 |
| 2003/0073873 | A1 | 4/2003 | Brons et al. ............. 568/679 |
| 2004/0266982 | A1 | 12/2004 | Clement et al. ......... 528/408 |
| 2005/0014979 | A1 | 1/2005 | Eleveld et al. .......... 568/679 |
| 2005/0215452 | A1 | 9/2005 | Ruland et al. ........... 510/421 |
| 2005/0256014 | A1 | 11/2005 | Sherman et al. ......... 508/579 |
| 2005/0272626 | A1 | 12/2005 | Wulff et al. ............. 510/421 |
| 2007/0225394 | A1 | 9/2007 | Ostrowski et al. |

FOREIGN PATENT DOCUMENTS

| JP | 6-16806 | 1/1994 |
| WO | 00/14045 | 3/2000 |
| WO | 2006/002807 | 1/2006 |

* cited by examiner

*Primary Examiner*—Brian P Mruk
(74) *Attorney, Agent, or Firm*—Noland J. Cheung; N. Denise Brown

(57) ABSTRACT

The present invention provides a process for the production of an alkylphenol ethoxylate involving charging a portion of product from a previous preparation (a "heel") or an ethoxylate to a reactor, optionally, charging from about 0.2 wt. % to an amount equal to or greater than the weight of the heel of an alkylphenol starter to the reactor, charging ethylene oxide to activate a double metal cyanide ("DMC") catalyst, adding the alkylphenol starter simultaneously with ethylene oxide for a portion of the process and continuing ethylene oxide addition following completion of the simultaneous alkylphenol starter and ethylene oxide addition. The process of the present invention provides significant improvements in cycle time and safety in producing ethoxylates which may find use in or as surfactants.

7 Claims, No Drawings

HIGH PRODUCTIVITY PROCESS FOR ALKYLPHENOL ETHOXYLATES

FIELD OF THE INVENTION

The present invention relates in general to polyether production processes and more specifically to high productivity processes for the production of alkylphenol ethoxylates useful in or as surfactants.

BACKGROUND OF THE INVENTION

The ethoxylates of various fatty alcohols and of alkylphenols are widely used in the soap and detergents industry. The majority of these ethoxylates are produced with either sodium or potassium hydroxide catalyzed processes. Although such processes are well established and have been optimized to reduce production costs, there are certain inherent constraints to using such base-catalyzed processes, including the necessity of relatively long cycle times and high ethylene oxide ("EO") concentrations during the ethoxylation reaction. These are semibatch processes in which the starting phenol and the base are charged to a reaction vessel and the system is heated to greater than 100° C. as water is removed to shift the equilibrium from potassium hydroxide base to the potassium phenoxide base. The reactor is inerted with nitrogen so that the gas phase is maintained in a safe range after the addition of ethylene oxide. The reactors operate at relatively high ethylene oxide pressures in the range of 20 to 60 psia at the completion of ethylene oxide addition.

The current processes are true semibatch processing in which the starting alcohol or phenol and catalyst is added and the ethylene oxide is added incrementally in a process controlled by the ability to remove the heat of reaction and the ability to maintain the ethylene oxide in safe operating range. After completion of the ethylene oxide addition, the process continues until the ethylene oxide is consumed and then the catalyst is neutralized with an organic acid to give a soluble potassium or sodium salt that remains in the product. The overall cycle time is the sum of several steps which can be summarized as: starter charge, water removal, ethylene oxide addition, ethylene oxide digestion, stripping to remove any residual oxide and acid neutralization.

With the current KOH process, the amount of time in which oxide is not being added constitutes a relative large proportion of the total reactor time. For example, the starter is charged to the reactor and with a 9.5 EO nonylphenol product, this amounts to about 35% of the total material added to the reactor. Potassium hydroxide is subsequently added, usually as an aqueous solution, followed by stripping to remove water and to shift the equilibrium so that the potassium is present as the potassium phenoxide salt of the starter. These process steps have the disadvantages of occupying a significant fraction of the process time, consuming energy and producing a waste stream. After oxide addition is complete, the requirement is to drop to very low levels of residual ethylene oxide, so that the less reactive KOH requires a longer time and the product likely must be stripped to remove residual ethylene oxide.

Although the co-addition of starter and oxide is disclosed by Pazos in U.S. Pat. No. 5,777,177 and in a continuous process by Pazos and Shih (U.S. Pat. No. 5,689,012), these references fail to teach using such processes for the production of surfactants and further fail to disclose the value of an oxide addition step in which no starter is added. Other processes in which oxide and starter are added simultaneously include those described for example in U.S. Pat. No. 7,012,164; U.S. Published Patent Application No. 2003/073873; Kokai JP 06-16806; and WO 03/025045.

The patent art for the production of ethoxylates by semibatch processes includes a large number of disclosures. For example, Clement et al. in U.S. Pat. No. 6,642,423, teach ethoxylation reactions with a double metal cyanide ("DMC") catalyst by feeding a first block of ethylene oxide followed by other blocks of propylene oxide or mixed oxides.

U.S. Pat. No. 6,821,308, issued to Combs et al. discloses oleophilic polyoxyalkylene monoethers having reduced water affinity. Combs et al. teach the alkoxylation of alcohols with DMC catalyst and exemplify propylene oxide, but not ethylene oxide. Eleveld et al., in U.S. Published Patent Application No. 2005/0014979, teach the use of DMC catalyst to prepare ethoxylated alcohols with DMC.

U.S. Published Patent Application No. 2005/0215452, in the name of Ruland et al., teaches $C_{10}$-alkanol alkoxylate mixtures and processes for their preparation. Example 1 of Ruland et al. discloses the use of DMC catalyst to ethoxylate a 2-propylheptanol with 5 moles of ethylene oxide.

U.S. Published Patent Application No. 2005/0272626, in the name of Wulff et al., teaches processes for the preparation of alkoxylates of the formula $RO(A)_n(B)_mH$, in the presence of double-metal cyanide compounds. Such alkoxylates are said to be useful as emulsifiers, foam regulators, wetting agents for hard surfaces and in detergents and surfactant formulations. The alkoxylates of Wulff et al. are said to provide better cleaning efficiency with reduced odors.

Grosch et al., in WO 00/14045, teach the preparation of ethoxylates of fatty alcohols using supported DMC catalysts along with propoxylation. WO 01/04178, in the name of Walker et al. gives several examples of ethoxylation. Sherman et al. in WO 05/113640, disclose metal cutting fluids containing alkylene oxide copolymers having low pulmonary toxicity. WO 06/002807, in the name of Ostrowski et al., teaches the production of ethoxylates in a continuous reactor equipped with more than one stage and using an oxide or a mixture of oxides in the second reactor that is different from the first reactor.

Thus, there remains a need for improved surfactant production processes. New ethoxylates processes preferably should provide "drop-in products" to avoid the costs of reformulating a wide range of detergents or provide other significant improvements that would offset the reformulation costs.

SUMMARY OF THE INVENTION

Accordingly, the present invention provides a modified semibatch process to produce alkylphenol ethoxylates useful in or as surfactants. The inventive process involves charging a portion of product from a previous preparation (a "heel") or an ethoxylate to a reactor, optionally, charging from about 0.2 wt. % to an amount equal or greater than the amount of heel of an alkylphenol starter to the reactor, charging ethylene oxide to activate a double metal cyanide ("DMC") catalyst, adding the alkylphenol starter simultaneously with ethylene oxide for a portion of the process and continuing ethylene oxide addition following completion of the simultaneous alkylphenol starter and ethylene oxide addition. The process of the present invention may provide significant improvements in cycle time and safety.

These and other advantages and benefits of the present invention will become apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides a process for the production of an alkylphenol ethoxylate involving charging a portion of product from a previous preparation (a "heel") or an ethoxylate to a reactor, optionally, charging in the amount ranging from 0.2 wt. % to an amount equal or greater than the amount of heel of an alkylphenol starter, to the reactor, charging ethylene oxide to activate a double metal cyanide ("DMC") catalyst, adding the alkylphenol starter simultaneously with ethylene oxide for a portion of the process and continuing ethylene oxide addition following completion of the simultaneous alkylphenol starter and ethylene oxide addition.

The process of the present invention combines the continuous addition of starter ("CAOS") addition of ethylene oxide and alkylphenol starter with the addition of an ethylene oxide cap in which little or no starter is added. In the inventive process, a small "heel" from a prior polyol preparation remains in the reactor and the initiation of ethylene oxide addition and alkylphenol starter addition occurs almost simultaneously, thereby eliminating a large period of nonproductive time observed in the currently practiced processes. As double metal cyanide ("DMC") catalysis is more effective than base catalysis, the time to reduce the ethylene oxide concentration to a very low level is shortened and may altogether avoid the necessity of stripping to achieve the target levels. If the heat exchanger capacity of the reactor is increased, an even greater increase in the productivity of the inventive process may be realized.

Preferred initiators or starters (the terms may be used interchangeably herein) in the inventive process are alkylphenols with the alkyl group having from 1 to 20 carbon atoms and more preferably from 3 to 13 carbon atoms. The alkyl group of the alkylphenol useful in the processes of the present invention may have a number of carbon atoms in an amount ranging between any combination of these values, inclusive of the recited values. The alkylphenol may optionally be branched. Particularly preferred initiators are nonylphenols, octylphenols and dodecylphenols.

The processes of the present invention may employ any double metal cyanide ("DMC") catalyst. Double metal cyanide complex catalysts are non-stoichiometric complexes of a low molecular weight organic complexing agent and optionally other complexing agents with a double metal cyanide salt, e.g. zinc hexacyanocobaltate. Suitable DMC catalysts are known to those skilled in the art. Exemplary DMC catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922, the entire contents of each of which are incorporated herein by reference. The DMC catalysts more preferred in the process of the present invention are those capable of preparing "ultra-low" unsaturation polyether polyols. Such catalysts are disclosed in U.S. Pat. Nos. 5,470,813 and 5,482,908, 5,545,601, 6,689,710 and 6,764,978, the entire contents of each of which are incorporated herein by reference. Particularly preferred in the inventive process are those zinc hexacyanocobaltate catalysts prepared by the processes described in U.S. Pat. No. 5,482,908.

The DMC catalyst concentration is chosen so as to ensure good control of the ethoxylation reaction under given reaction conditions. The catalyst concentration is preferably from 5 ppm to 1,000 ppm, more preferably in the range of from 10 ppm to 500 ppm, and most preferably in the range from 20 ppm to 100 ppm, based on the final ethoxylate weight. The ethoxylation in the process of the present invention may occur in the presence of DMC catalyst in an amount ranging between any combination of these values, inclusive of the recited values.

The alkylphenol ethoxylates produced by the inventive process preferably have a number average molecular weight of from 150 Da to 20,000 Da, more preferably from 250 Da to 12,000 Da, most preferably from 350 Da to 750 Da. The alkylphenol ethoxylates produced by the inventive process may have a number average molecular weight ranging between any combination of these values, inclusive of the recited values. The alkylphenol ethoxylates produced by the inventive processes may preferably find use in or as surfactants.

The present inventors have found that the cycle time to produce surfactants can be substantially improved by the inventive double metal cyanide catalyst ("DMC") process. In this process, a sufficient amount of the product ("heel") is allowed to remain in the reactor so that the heat exchanger is operable. The amount required will vary with reactor configuration and whether the heat exchanger is internal or external. The catalyst is added to the reactor. (Optionally, the catalyst can be added incrementally based on the amount of ethylene oxide or starter that has been added.) There are two options at this point:

1. charge a small amount of starter and then initiate the reaction by adding ethylene oxide to activate the system (DMC catalysts generally require an activation period; whereas potassium hydroxide and other base catalysts do not require an activation period); or
2. start the ethylene oxide addition prior to the addition of any starter.

After initiation or activation, there is a co-feed of ethylene oxide and alkylphenol starter. The molar ratio of ethylene oxide/alkylphenol starter during the simultaneous feed of EO and alcohol is smaller than the ratio desired for the final product and after the alkylphenol starter addition is complete, the remainder of the ethylene oxide is added (non-CAOS addition). The inventive reaction sequence is as follows:

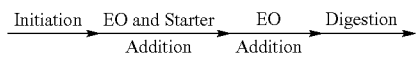

The relative amount of non-CAOS addition is important in obtaining a given product distribution, i.e., polydispersity. The amount of EO divided by the final weight of product produced gives the percentage of non-CAOS addition.

The inventive process offers a number of advantages over the currently used potassium or sodium hydroxide-catalyzed processes. The alkylphenol starter addition step and the water stripping steps may be eliminated, thus resulting in a savings of time and energy that would otherwise be required to heat the starter to stripping temperature. Other improvements include the operation of the reactor at lower EO pressures.

DMC catalysts are more reactive than basic catalysts and thus the EO pressure is relatively low even with DMC catalyst concentrations of less than 100 ppm. Because the pressure is so low at the completion of oxide addition and the system utilizes such a high reactivity catalyst, the digestion time is shorter than that seen with basic catalysis. The combination of these improvements provides a significant improvement in cycle time. The lower ethylene oxide pressure also makes the process inherently safer than the current higher pressure base-catalyzed processes.

Although cycle time is important, as it may be reflected in process costs, it is also important that the product produced by a new process have properties that are similar to those of current products. With the process of the present invention, product may be produced having similar characteristics as the commercially used base-catalyzed processes, i.e., having similar polydispersities and unreacted monomer contents. The final EO addition step in which no starter is added is a factor in producing such similar products because it reduces the amount of unreacted alcohol and narrows the product molecular weight distribution. The optimum amount of EO added in this step will depend on the product being produced, but it is expected that the amount of oxide added in this step is greater than four percent (this percentage is defined as the weight of EO added as a cap divided by the weight of the total product produced).

The inventive process is designed to take advantage of one of the unique properties of the DMC catalysts in that DMC catalysts show a preferential affinity for catalyzing the reaction of oxides with lower molecular weight components in preference to higher molecular weight components. This property allows both the reduction of the unreacted starter and a narrowing of the molecular weight distribution. The molecular weight distribution becomes narrower because polyethers in the lower molecular weight region react with some selectivity in comparison with the higher molecular weight polyethers. If a similar process was adapted for use with base catalysis, the narrowing of the molecular weight distribution and reduction of the unreacted alcohol would not occur to the same extent.

EXAMPLES

The present invention is further illustrated, but is not to be limited, by the following examples. All quantities given in "parts" and "percents" are understood to be by weight, unless otherwise indicated. A two-gallon pressure reactor was equipped with multiple feed systems, process control, heat/cooling capability, safety relief system and vacuum capability. The catalyst used in the Examples was a double metal cyanide ("DMC") catalyst made according to U.S. Pat. No. 5,482,908. A brief description of the overall process used in the Examples follows:

1. charge a portion of product (a "heel") or ethoxylate to the reactor or leave some product in the reactor from previous preparation (also a "heel" herein);
2. optionally, charging starter in the amount ranging from about 0.2 wt. % to an amount equal or greater than the amount of heel of alkylphenol starter to the reactor (may aid in reducing the polydispersity of the product at some molecular weights);
3. charge ethylene oxide and activate catalyst (by starting with some product (heel) in the reactor that has activated catalyst, may observe almost instantaneous activation);
4. for a portion of the process, charge alkylphenol starter simultaneously with ethylene oxide; and
5. continue ethylene oxide addition after completion of the alkylphenol starter addition. (non-CAOS)

Example C-1

The control was a sample of 9.5 mole ethoxylate of nonylphenol commercially available from the Huntsman Corporation.

Example 2

A 9.5 mole EO ethoxylate of nonylphenol (550 g) and DMC catalyst (0.136 g) was charged to a reactor. The mixture was heated to 130° C. and stripped. Ethylene oxide (56 g) was charged to the reactor and after activation started, the ethylene oxide feed (2485 g) was fed at a feed rate of 497 g of EO per hour along with nonylphenol (1380 g) at a rate of 473 g/hr. After completion of the nonylphenol ("NP") and ethylene oxide ("EO") additions, digestion at 130° C. for 30 minutes. The product was cooled and discharged from the reactor.

Examples 3 to 7

The procedure described in Example 2 was repeated except with the charge factors and feed rates as given below.

TABLE I

| Ex. No. | Catalyst (g) | NP 9.5 EO in heel | NP in heel (g) | EO | EO feed rate (g/hr) | NP added | NP feed rate (g/hr) |
|---|---|---|---|---|---|---|---|
| 3 | 0.13 | 600 | 0 | 2508 | 490 | 1320 | 370 |
| 4 | 0.13 | 600 | 0 | 2504 | 490 | 1320 | 370 |
| 5 | 0.13 | 600 | 0 | 2508 | 490 | 1320 | 304 |
| 7 | 0.14 | 550 | 60 | 2540 | 497 | 1380 | 1200* |

*the first 177.1 g was added at 352 g/hr

Table II below summarizes nonylphenol ethoxylates (9.5 EO Adducts) in which STARTER A was used. As can be appreciated by reference to Table II, the KOH-catalyzed nonylphenol ethoxylates have narrower molecular weight distributions than the corresponding aliphatic alcohol ethoxylates. The polydispersity for nonylphenol 9.5 EO is about 1.08; whereas, a $C_{13}$ 9 EO product has a polydispersity of 1.127. This difference is attributable to the acidity of the phenolic hydrogen which is preferentially alkoxylated with KOH to form a narrow distribution one-EO adduct. The relative differences in the rates of KOH ethoxylation between the nonylphenol one mole EO adduct and those of other nonylphenol homologs are less than the corresponding differences between the alcohol and alcohol EO homologs. This small difference produces a more narrow distribution. The semi-batch production of a nonylphenol 9.5 EO gives a polydispersity of 1.033 (1.045 if PEG's formed during the process are included, the PEG's are likely formed from water in the EO) versus 1.076 for the KOH-based product.

TABLE II

| Ex. No. | Non-CAOS amount (%) | Polydispersity | OH No. | Comments |
|---|---|---|---|---|
| C-1 |  | 1.076 |  |  |
| 2 | 23 | 1.132 |  |  |
| 3 | 15.8 | 1.154 | 96 |  |
| 4 | 15.8 | 1.139 | 91.8 |  |
| 5 | 7.5** | 1.201 | 90.2 |  |
| 7 | 23 | 1.137 |  | bimodal |

**a larger amount of ethylene oxide was added for catalyst activation

The foregoing examples of the present invention are offered for the purpose of illustration and not limitation. It will be apparent to those skilled in the art that the embodi-

What is claimed is:

1. A process for the production of an alkylphenol ethoxylate comprising:
    charging a portion of product from a previous preparation (a "heel") or an ethoxylate to a reactor;
    optionally, charging from about 0.2 wt. % to an amount equal to or greater than the amount of heel, of an alkylphenol starter to the reactor;
    charging ethylene oxide to activate a double metal cyanide ("DMC") catalyst;
    adding the alkylphenol starter simultaneously with ethylene oxide for a portion of the process; and
    continuing ethylene oxide addition following completion of simultaneous alkylphenol starter and ethylene oxide addition.

2. The process according to claim 1, wherein the alkylphenol starter alkyl group contains from 1 to 20 carbon atoms.

3. The process according to claim 1, wherein the alkylphenol starter alkyl group contains from 3 to 13 carbon atoms.

4. The process according to claim 1, wherein the alkylphenol starter is selected from nonylphenols, octylphenols and dodecylphenols.

5. The process according to claim 1, wherein the alkylphenol ethoxylate has a number average molecular weight of from about 150 Da to about 20,000 Da.

6. The process according to claim 1, wherein the alkylphenol ethoxylate has a number average molecular weight of from about 250 Da to about 12,000 Da.

7. The process according to claim 1, wherein the alkylphenol ethoxylate has a number average molecular weight of from about 350 Da to about 750 Da.

* * * * *

UNITED STATES PATENT AND TRADEMARK OFFICE
CERTIFICATE OF CORRECTION

PATENT NO.       : 7,473,677 B2
APPLICATION NO.  : 11/787351
DATED            : January 6, 2009
INVENTOR(S)      : Kenneth G. McDaniel et al.

Page 1 of 1

It is certified that error appears in the above-identified patent and that said Letters Patent is hereby corrected as shown below:

On title page, item 75 Inventors,
replace "James R. Reese, II"
with "Jack R. Reese, II."

Signed and Sealed this

Thirty-first Day of March, 2009

JOHN DOLL
*Acting Director of the United States Patent and Trademark Office*